United States Patent [19]

Duckworth

[11] 4,200,062
[45] Apr. 29, 1980

[54] SAFETY SWITCH FOR HYDROGEN GENERATOR SYSTEM

[76] Inventor: Charles E. Duckworth, 1421 SE. 10th St., Deerfield Beach, Fla. 33441

[21] Appl. No.: 923,863

[22] Filed: Jul. 12, 1978

[51] Int. Cl.$^2$ ............................................. F02B 43/08
[52] U.S. Cl. ...................................... 123/1 A; 123/3; 123/119 E; 123/DIG. 12
[58] Field of Search .................. 123/DIG. 12, 1 A, 3, 123/119 E

[56] References Cited

U.S. PATENT DOCUMENTS

| | | | |
|---|---|---|---|
| 3,648,668 | 3/1972 | Pacheco | 123/3 |
| 4,023,545 | 5/1977 | Mosher et al. | 123/3 |
| 4,031,865 | 6/1977 | Dufour | 123/1 A |
| 4,141,326 | 2/1979 | Wolber | 123/DIG. 12 |

Primary Examiner—Charles J. Myhre
Assistant Examiner—Craig R. Feinberg
Attorney, Agent, or Firm—C. Lamont Whitham

[57] ABSTRACT

A safety cutoff switch for a hydrogen gas generator system is disclosed. The hydrogen gas generator system is of the type for use with automotive internal combustion engines wherein combustible hydrogen gas generated by the system is co-mingled with exhaust gases from the internal combustion engine and fed into the intake manifold. The hydrogen gas generator system includes a group or groups of hydrogen gas fuel cells which are provided with electrical current generated by alternators driven by the engine or the automotive drive train. The current from the alternators is supplied through the safety cutoff switch and individual, manually operable switches to each fuel cell. The safety cutoff switch comprises a solenoid structure having a spring biased armature carrying an electrical contactor for making an electrical circuit between two electrical contact posts. Movement of the armature makes or breaks electrical contact between the two electrical contact posts, and the spring bias of the armature is such that the electrical circuit between the two electrical contact posts is normally an open circuit. A pair of vacuum actuators are provided to act against the spring bias of the armature and cause the electrical contactor to make the circuit between the two electrical contact posts. One of the vacuum actuators is connected by a hose to the venturi of the engine carburetor, while the other vacuum actuator is connected by a hose to the intake manifold. Thus, when the engine is running, one or the other of the vacuum actuators operates to actuate the safety cutoff switch, but in the event that the engine stops running, the spring bias of the switch opens the electrical circuit supplying current to the fuel cells.

5 Claims, 2 Drawing Figures

SAFETY SWITCH FOR HYDROGEN GENERATOR SYSTEM

BACKGROUND OF THE INVENTION

The present invention generally relates to hydrogen gas generator systems for use as supplemental fuel sources for automotive internal combustion engines and, more particularly, to a safety cutoff switch for stopping the production of hydrogen by the fuel cells when the engine stops running.

The generation of hydrogen as a supplemental fuel for internal combustion engines has been well known for many years. For example, U.S. Pat. No. 1,632,285 to Georgi discloses a gas generator wherein a combustible gas is formed from a hydrogenator and co-mingled with exhaust gases from an internal combustion engine and fed into the carburetor inlet manifold. Suitable valves prevent a back pressure flow from the engine, and means are provided for the use of a rheostat and ammeter to control the supply of current to the electrodes of the hydrogenator. More recently, U.S. Pat. No. 4,023,545 to Mosher et al. discloses an energy means for internal combustion engines utilizing a hydrogenator as an auxiliary system to enhance the combustion of the fuels used within the engine. Suitable valves are arranged within the manifold section for supplying the hydrogen and oxygen gases.

The use of hydrogen as an auxiliary fuel has been attractive for many years and is now the subject of considerable investigation because of the impending shortages of hydrocarbon fuels. In its simplest form, a hydrogen generating fuel cell is simply an electrolytic cell which produces hydrogen and oxygen by the electrolysis of water. All that is needed is a source of electrical current to supply the electrolytic cell, and this can be provided by means of an alternator driven by the engine or the drive train of the automotive vehicle. There are, however, certain dangers in the use of hydrogen as a fuel due to its being so highly combustible. Because of this, it is preferable to consume the hydrogen gas as a fuel as it is generated rather than accumulate and store it.

In my earlier U.S. Pat. No. 4,068,628, I disclosed a multi-cylinder, gasoline burning, internal combustion engine which is converted by modification of the intake and exhaust manifolds to an engine having designated exhaust burning cylinders which burn the exhaust gases that are expelled from the gasoline burning cylinders. To this system, I have added a hydrogen generating system which supplies the highly combustible hydrogen gas to the intake manifold for the designated exhaust burning cylinders. While this system works quite well, it is necessary to consider the safety of the system should it be in general public use. For example, in the event of an accident or for some reason the engine stops running so that the hydrogen generated is not consumed in the normal operation and functioning of the automobile, it is necessary to provide some means by which the production of the hydrogen is stopped when the engines stops running.

The above-referenced patent to Mosher et al. also recognizes that, as a prerequisite to the generation of hydrogen for supply to the intake manifold, the engine must be operating. U.S. Pat. No. 3,710,770 to Newkirk et al. discloses a pressure switch which is used as a safety switch to shut off the supply of hydrogen to the engine in the event that the engine does not start as it should. Neither Mosher et al. or Newkirk et al., however, provide a fail-safe system which will quickly and positively cause the generation of hydrogen to cease in the event that the engine stops running.

SUMMARY OF THE INVENTION

It is therefore an object of my invention to provide a safety cutoff switch for a hydrogen gas generator system of the type used to supply hydrogen gas as a supplemental fuel to automotive internal combustion engines and, more particularly, to such a safety cutoff switch which is fail-safe, assuring the instantaneous and positive cessation of hydrogen production when the engine stops running.

My safety cutoff switch is particularly useful in a hydrogen gas generating system wherein one or more groups of hydrogen gas fuel cells are provided with electrical current generated by alternators driven by the engine or the automotive vehicle drive train. The current from the alternators is supplied through the safety cutoff switch and individual, manually operable switches to each fuel cell. A separate ammeter may be provided for each group of fuel cells, and the ammeters and manually operable switches may be conveniently located on the instrument panel of the automotive vehicle.

According to the present invention, the safety cutoff switch comprises a solenoid structure having a spring biased armature which carries an electrical contactor. Linear movement of the armature causes the electrical contactor to contact or move away from two electrical contact posts, thereby making or breaking an electrical circuit connected to the two electrical contact posts. The spring bias on the armature is such as to make the armature move the electrical contactor out of contact with the two electrical contact posts so that the electrical circuit connected thereto is normally opened. A pair of vacuum actuators are mechanically connected to the armature of the switch and act against the spring bias of the armature to cause the electrical contactor to come into contact with the two electrical contact posts and make the electrical circuit connected thereto. One of the vacuum actuators is connected by a hose to the venturi of the engine carburetor, while the other vacuum actuator is connected by a hose to the intake manifold. As is well known, when the throttle of the carburetor is closed, the intake manifold of the engine is at a low pressure or high vacuum, whereas the venturi of the carburetor is at a high pressure or low vacuum. Thus, when the engine is running and the throttle is closed, the vacuum actuator connected to the intake manifold operates to move the switch armature against the spring bias so as to bring the electrical contactor into contact with the two electrical posts of the switch. On the other hand, when the throttle valve is open, the intake manifold is at a high pressure or low vacuum, whereas the carburetor venturi is at low pressure or high vacuum. Thus, when the engine is running and the throttle valve is in the open position, the vacuum actuator connected to the carburetor venturi acts against the spring bias of the switch armature to bring the electrical contactor into contact with the two electrical posts of the switch. Thus, when the engine is running, one or the other of the vacuum actuators operates to actuate the safety cutoff switch so as to make the electrical circuit which is connected to the two electrical posts, but in the event that the engine stops running, the spring bias of the switch armature opens the electrical circuit and stops the supply of current to the fuel cells.

BRIEF DESCRIPTION OF THE DRAWINGS

Other objects, aspects and advantages of the invention will be better understood from the following detailed description of a preferred embodiment with reference to the accompanying drawings, in which.

DESCRIPTION OF THE PREFERRED EMBODIMENT

Figure 1:
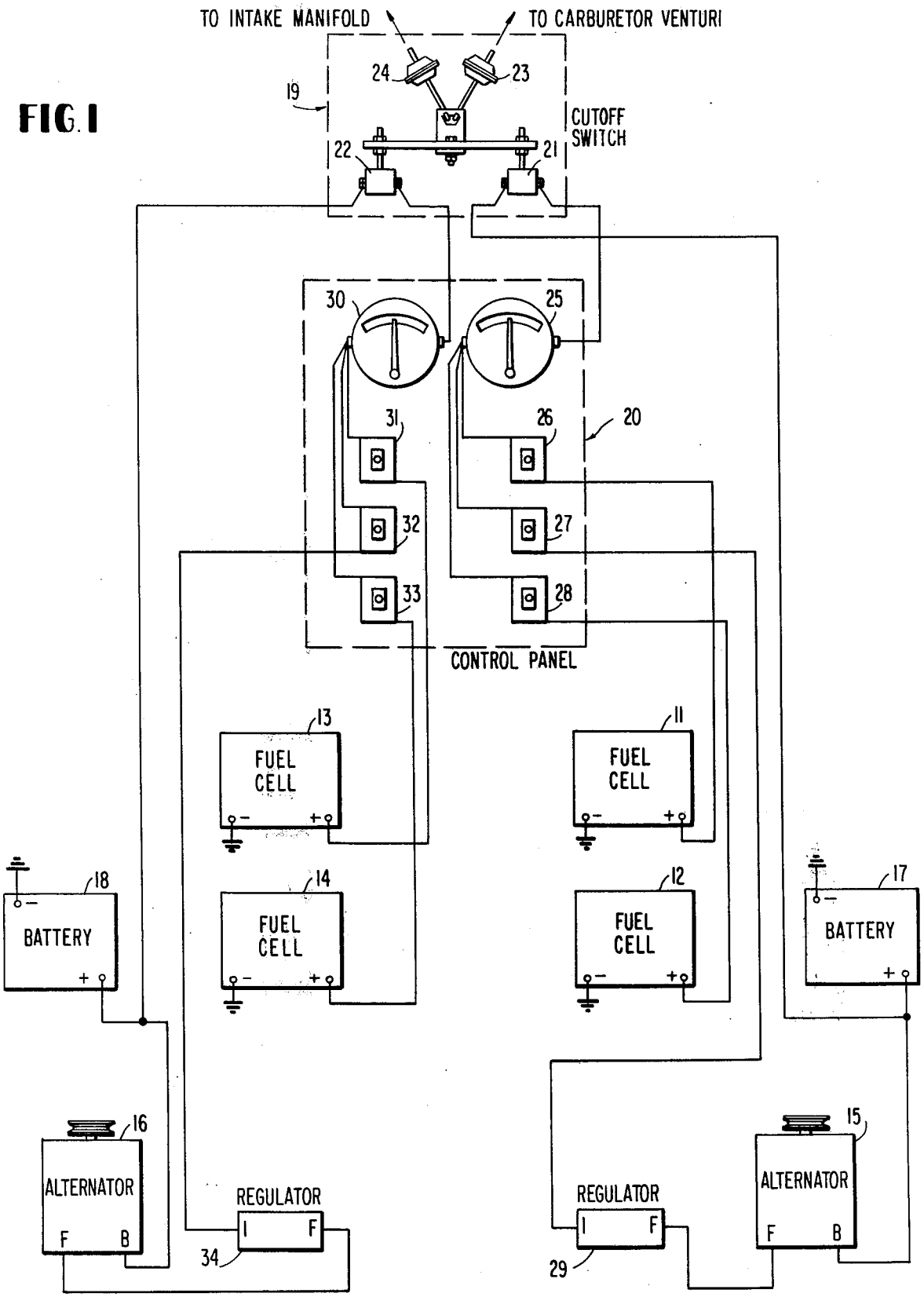
FIG. 1 is a schematic diagram showing a hydrogen generating system using the safety cutoff switch according to my invention.

Referring now to the drawings and, more particularly, to FIG. 1, there is shown a hydrogen gas generator system comprising two groups of fuel cells 11, 12 and 13, 14. The fuel cells in each group are electrically connected in parallel and supplied with current generated by respective alternators 15 and 16. The alternators 15 and 16 can be driven by a crankshaft pulley provided on the engine, or, in one actual embodiment of the system, the alternators 15 and 16 are driven by a pulley attached to the differential in the drive train of the automotive vehicle. The alternators 15 and 16 are energized by batteries 17 and 18, respectively, and supply current through the cutoff switch 19 and the control panel 20 to each of the respective groups of fuel cells 11, 12 and 13, 14. The cutoff switch 19 will be described in more detail with reference to FIG. 2, but generally comprises two solenoid switch structures 21 and 22 operated by a pair of vacuum actuators 23 and 24 acting through a control link and actuator bar assembly. One solenoid switch structure 21 or 22 is provided for each group of fuel cells 11, 12 or 13, 14. The vacuum actuator 23 is connected by a hose to the carburetor venturi, while the vacuum actuator 24 is connected by a hose to the intake manifold of the engine.

The control panel 20 comprises an ammeter and a bank of manually operable switches for each group of fuel cells. Thus, current generated by alternator 15 for fuel cells 11 and 12 is supplied via the solenoid switch structure 21 to an ammeter 25 and thence in parallel to switches 26 and 28 which supply current to fuel cells 11 and 12, respectively. In addition, a switch 27 is connected between the ammeter 25 and a voltage regulator 29 which controls the current returned to the field winding of the alternator 15. Thus, by means of manually operable switches 26 and 28, it is possible for the operator to connect or disconnect the supply of current to the fuel cells 11 and 12, and, by means of switch 27, it is possible for the operator to turn off alternator 15. However, it will be observed that by turning off alternator 15, current will still be supplied to fuel cells 11 and 12 by battery 17.

Similar connections are made for the second group of fuel cells 13 and 14. Specifically, battery 18 energizes alternator 16 which supplies current through the solenoid switch structure 22 to ammeter 30. Switches 31, 32 and 33 are connected in parallel to ammeter 30, switches 31 and 33 being connected to supply fuel cells 13 and 14, while switch 32 is connected to supply current via voltage regulator 34 to alternator 16. Fuel cells 13 and 14 can be turned on or off by means of manually operable switches 31 and 33, and alternator 16 can be turned on or off by means of manually operable switch 32. But, again, when the alternator 16 is turned off by means of manually operable switch 32, current is still supplied to fuel cells 13 and 14 by battery 18.

It will be appreciated that if only one group of fuel cells is used, then only one alternator, battery, solenoid switch structure, ammeter and group of manually operable switches are required. Conversely, each additional group of fuel cells is preferably provided with its own alternator, battery, solenoid switch structure, ammeter and group of manually operable switches.

While the control panel 20 provides manual switch control of each one of the fuel cells and each one of the alternators, the purpose of this invention is provide a safety cutoff switch which will ensure that current to all of the fuel cells will be interrupted when the engine is not running or ceases to run as may happen, for example, in an accident. Especially under the emergency conditions that may be presented in the event of an accident, it is imperative that there be a cessation of the generation of hydrogen which is highly flammable. The safety cutoff switch 19 provides a fail-safe control, ensuring that current is cut off to each of the fuel cells when the engine is not running.

Figure 2:
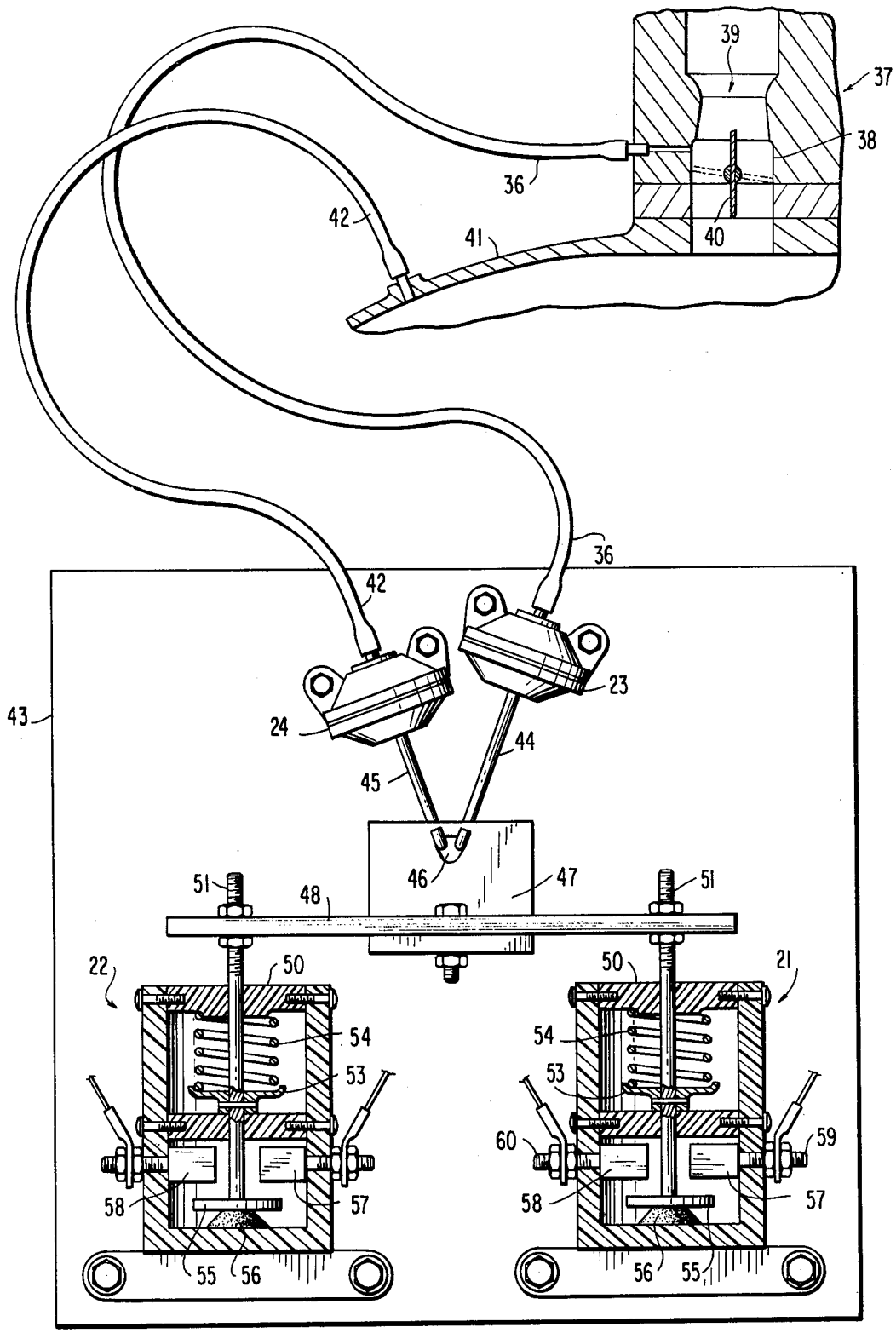
FIG. 2 is a detailed view, partially in cross section, of a preferred embodiment of the safety cutoff switch according to the invention.

Reference is now made to FIG. 2 which shows in more detail the structure of the safety cutoff switch according to the invention. The vacuum actuator 23 is connected by a hose 36 to the venturi area of a carburetor 37 for the automobile engine. The carburetor 37 is shown only very schematically but comprises a barrel 38 having a venturi area 39 and a throttle valve 40. Carburetor 37 is mounted on the intake manifold 41 of the engine. The vacuum actuator 24 is connected by hose 42 to the intake manifold 41. The throttle 40 is shown in the full open position in the figure, and, as is well known, this results in a low pressure or a high vacuum condition in the venturi area of the carburetor 37 and a high pressure or low vacuum condition in the intake manifold 41. As a result, the vacuum actuator 23 is actuated, but the vacuum actuator 24 is not. On the other hand, when the throttle valve 40 is in the full closed position, there results a high pressure or low vacuum condition in the venturi area 39 of the carburetor 37 and a low pressure or high vacuum condition in the intake manifold 41. Under this condition, the vacuum actuator 24 is actuated, but the vacuum actuator 23 is not. The important point to be understood is that one or the other of the vacuum actuators 23 or 24 will be actuated when the engine is running; however, when the engine ceases to run, neither of the vacuum actuators 23 or 24 are actuated.

The vacuum actuators 23 and 24 are suitably mounted to a fixed plate 43, but may just as easily be mounted to the fire wall of the engine compartment. The actuators 23 and 24 operate through the link and bar assembly to control the solenoid switch structures 21 and 22. More specifically, vacuum actuator 23 is provided with a hooked actuator rod 44, and vacuum actuator 23 is provided with a hooked actuator 45. Both of the hooked actuator rods 44 and 45 engage a slot 46 in plate 47. The plate 47 is attached to a bar 48 made of an electrical insulating material, such as a suitable plastic. One end of the bar 48 is connected to the armature of switch solenoid structure 21, while the other end of bar 48 is connected to the armature of solenoid switch structure 22.

The solenoid switch structures 21 and 22 are identical, and, therefore, the description of these structures will be made only with reference to solenoid switch structure 21, it being understood that the same description applies to solenoid switch structure 22. The solenoid switch structure 21 has an outer shell case 49 made of an electrical insulating material, such as a suitable plastic. This shell case 49 is fixedly attached to the plate 43 or directly to the fire wall of the engine compartment. The top of the case 49 is closed with a cover plate 50 having an aperture therein through which the armature shaft 51 passes to the attachment at the end of bar 48. A second plate 52 similar to the cover plate 50 is positioned within the case 49 and also has an aperture through which the shaft 51 of the armature passes. The plates 50 and 52 are preferably made of a plastic material and act as bearings for the axial movement of the armature shaft 51. The armature shaft 51 is provided with a spring retainer plate 53 which is fixedly attached thereto. A coil spring 54 is positioned between the spring retainer 53 and the under surface of the top cover plate 50. The spring 54 biases the armature shaft 51 for movement in a downward direction as viewed in the figure. At the lowermost end of the armature shaft 51, there is fixedly attached an electrical contactor 55. The electrical contactor may be made of brass or other suitable good electrical conductor. Just below the electrical contactor 55 is a resilient bumper 56 made of rubber or other elastomeric material. The purpose of the bumper 56 is to arrest the downward movement of the armature shaft 51 and contactor 55 and provide quietness of operation of the switch. Two electrical contact posts 57 and 58 are positioned within the case 49 on opposite sides thereof and above the electrical contactor 55. Electrical post 57 is provided with a threaded electrical terminal 59 which projects through the case 49 for connection to ammeter 25 on the control panel 20. Electrical contact post 58 is also provided with an electrical terminal 60 which projects through the case 49 for connection to the positive terminal of battery 17. Both the electrical contact posts 57 and 58 and their respective terminals 59 and 60 may be made of brass or other suitable good electrical conductor.

In operation, when the engine is not running, the electrical armature shaft 51 is in its downward-most position so that the electrical contactor 55 rests on the bumper 56 and out of contact with the electrical posts 57 and 58. However, once the engine is running, one or the other of the vacuum actuators 23 or 24 will be actuated so that their respective actuator shafts 44 or 45 will exert an upward force on the plate 47, thereby pulling armature shaft 51 upwardly against the bias spring 54 so that the electrical contactor 55 will contact the electrical posts 57 and 58, thereby making the circuit between the positive terminal of battery 17 and the ammeter 25. Should the engine stop running, then neither of the vacuum actuators 23 or 24 will be actuated, with the result that no upwardly directed force will be applied to the plate 47 so that the bias spring 54 will cause the armature shaft 51 to move downwardly, thereby breaking the circuit between the positive terminal of battery 17 and the ammeter 25.

While a preferred embodiment of the invention has been described, it will be understood by those skilled in the art that the various modifications and arrangements can be made without departing from the scope of the invention. The system as described provides electrical current for the independent operation of multiple groups of hydrogen fuel cells. It is preferred to have this electrical system independent of the vehicle electrical system, but, if desired, the two electrical systems could be connected in parallel to provide a unified electrical system for the vehicle. This could be helpful in case of failure of an alternator or a battery. For example, if the battery normally used for the vehicle starter and ignition system became completely discharged and the starter therefore could not start the vehicle, a switch could be provided between the vehicle system battery and one of the hydrogen fuel cell auxiliary batteries (17 or 18) which would enable the starter to function. It will be appreciated, however, that whatever form the electrical system takes, the invention provides a fail-safe safety cutoff switch which assures that the generation of hydrogen by the fuel cells will stop immediately upon the cessation of the running of the engine.

What is claimed is:

1. A safety cutoff switch for use in a hydrogen generating system supplying hydrogen gas as a supplemental fuel to an internal combustion engine, said hydrogen generating system comprising at least one group of fuel cells connected through said safety cutoff switch to a source of electrical current and said internal combustion engine having an intake manifold and a carburetor comprising a venturi and a throttle valve, said carburetor being attached to said intake manifold for supplying a fuel and air mixture to said engine, said safety cutoff switch comprising:
    a first vacuum actuator means connected by a hose to said carburetor venturi;
    a second vacuum actuator means connected by a hose to said intake manifold; and
    switch means mechanically connected to both of said first and second vacuum actuators for actuation thereby to make an electrical connection between said group of fuel cells and said source of electrical current when said engine is running, said switch means breaking said electrical connection in the absence of actuation by both of said first and second vacuum actuator means.

2. A safety cutoff switch as recited in claim 1 wherein said hydrogen generating system comprises a plurality of groups of fuel cells, each group being connected through said safety cutoff switch to said source of electrical current, said safety cutoff switch having a plurality of switch means, one for each group of fuel cells, each of said switch means being mechanically connected in common to both of said first and second vacuum actuators.

3. A safety cutoff switch as recited in claim 1 wherein said switch means comprises spring bias means for breaking said electrical connection in the absence of actuation by both of said first and second vacuum actuator means.

4. A safety cutoff switch as recited in claim 1 wherein said switch means comprises:
    an armature shaft mechanically connected to, but electrically insulated from, said first and second vacuum actuator means for movement thereby;
    an electrical contactor fixedly attached to said armature shaft;
    first and second electrical contact posts positioned for mating contact with said electrical contactor upon movement of said armature shaft by one or the other of said first and second vacuum actuators, said first and second electrical contact posts being electrically connected to said group of fuel cells and to said source of current, respectively; and
    spring bias means acting on said armature shaft in a manner to urge said electrical contactor to move out of contact with said first and second electrical contact posts.

5. A safety cutoff switch as recited in claim 4 wherein said armature shaft moves linearly.

* * * * *